(12) United States Patent
Owen (10) Patent No.: US 7,385,610 B2
(45) Date of Patent: Jun. 10, 2008

(54) SYSTEM AND METHOD FOR DISPLAYING GRAPHICS

(75) Inventor: Kevin Owen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

(21) Appl. No.: 09/982,906

(22) Filed: Oct. 18, 2001

(65) Prior Publication Data

US 2003/0076330 A1 Apr. 24, 2003

(51) Int. Cl.
*G09G 5/00* (2006.01)
*G06F 15/00* (2006.01)
*G06T 11/00* (2006.01)
*H04N 1/40* (2006.01)
*G06T 11/80* (2006.01)

(52) U.S. Cl. .................. 345/581; 345/619; 345/1.2; 715/700; 715/748; 715/734; 715/735; 358/1.13; 347/5

(58) Field of Classification Search ............ 345/581, 345/1.1, 2.1, 3.1, 3.4, 619, 650, 1.2, 418; 358/1, 1.14, 1.15, 501, 504, 505, 401, 474, 358/400, 1.13, 1.16, 448; 709/201, 203, 709/218; 710/33; 715/526, 700, 748, 733–736, 715/737, 740–741, 743, 200–204, 273–274, 715/772; 347/3–5

See application file for complete search history.

(56) References Cited

U.S. PATENT DOCUMENTS

| | | | | |
|---|---|---|---|---|
| 4,714,940 A | * | 12/1987 | Inoue et al. | 399/6 |
| 5,046,027 A | * | 9/1991 | Taaffe et al. | 345/557 |
| 5,751,445 A | * | 5/1998 | Masunaga | 382/236 |
| 5,832,298 A | * | 11/1998 | Sanchez et al. | 710/8 |
| 6,065,041 A | * | 5/2000 | Lum et al. | 709/203 |
| 6,167,439 A | * | 12/2000 | Levine et al. | 709/217 |
| 6,259,449 B1 | * | 7/2001 | Saxena et al. | 715/853 |
| 6,271,805 B1 | * | 8/2001 | Yonezawa | 345/1.1 |
| 6,300,959 B1 | * | 10/2001 | Gabler et al. | 345/473 |
| 6,466,183 B1 | * | 10/2002 | Yamamoto et al. | 345/1.1 |
| 6,469,796 B1 | * | 10/2002 | Leiman et al. | 358/1.15 |
| 6,483,878 B1 | * | 11/2002 | Yonezawa et al. | 375/240.25 |
| 6,486,968 B2 | * | 11/2002 | Nishikawa | 358/1.15 |
| 6,618,163 B1 | * | 9/2003 | Roosen et al. | 358/1.15 |
| 6,664,988 B1 | * | 12/2003 | Rollins | 715/853 |

(Continued)

FOREIGN PATENT DOCUMENTS

EP 1150499 A2 10/2001

(Continued)

*Primary Examiner*—Wesner Sajous (57) ABSTRACT

The present disclosure relates to a system and method for displaying graphics. In one arrangement, the method can comprise the steps of receiving an identification of graphical data representing the graphic, and facilitating transmission of the graphical data representing the graphic to the electrical device such that the electrical device can display the graphic. In another arrangement, the method can comprise the steps of receiving graphical data from a computing device, receiving an indication as to how the graphic is to be displayed, and displaying the graphic according to the received indication.

9 Claims, 6 Drawing Sheets

U.S. PATENT DOCUMENTS

| | | | |
|---|---|---|---|
| 6,665,090 B1* | 12/2003 | Hall et al. | 358/1.18 |
| 6,678,068 B1* | 1/2004 | Richter et al. | 358/1.15 |
| 6,717,686 B1* | 4/2004 | Farros et al. | 358/1.1 |
| 6,732,170 B2* | 5/2004 | Miyake et al. | 709/223 |
| 6,798,530 B1* | 9/2004 | Buckley et al. | 358/1.13 |
| 7,027,172 B1* | 4/2006 | Parulski et al. | 358/1.15 |
| 7,051,281 B1 | 5/2006 | Yokota | 715/740 |
| 2002/0051181 A1* | 5/2002 | Nishimura | 358/1.15 |
| 2002/0140693 A1* | 10/2002 | Nakami et al. | 345/418 |
| 2003/0072025 A1* | 4/2003 | Simpson et al. | 358/1.15 |
| 2005/0141030 A1* | 6/2005 | Tuchitoi et al. | 358/1.16 |
| 2005/0256941 A1* | 11/2005 | Armstrong et al. | 709/219 |

FOREIGN PATENT DOCUMENTS

| | | |
|---|---|---|
| JP | 7066832 A | 3/1995 |
| JP | 11055532 A | 2/1999 |
| JP | 11338445 A | 12/1999 |
| JP | 2001169228 | 6/2001 |

* cited by examiner

FIG. 6D

SYSTEM AND METHOD FOR DISPLAYING GRAPHICS

FIELD OF THE INVENTION

The present disclosure relates to a system and method for displaying graphics. More particularly, the disclosure relates to a system and method with which customized graphics can be displayed on an electrical device during various stages of device operation.

BACKGROUND OF THE INVENTION

Many electrical devices include displays that are used to present various graphical information to users of the devices. For example, many peripheral devices such as photocopiers, printers, facsimile machines, and multifunction peripherals (also known as "all-in-one" devices) include liquid crystal displays (LCDs) that are used to communicate various information about the operation of the devices to the user.

Most existing electrical devices are limited in the presentation of graphical information. For instance, most devices only present textual information to the user that either display information that has been entered by the user or various messages that are pertinent to various modes of operation of the devices. While some electrical devices are capable of displaying simple graphics, or images, to the users in specific situations, e.g., printers that identify the location of a printing media jam with a graphical representation of the jam location, such graphics are limited in number. Moreover, the graphics are static in that they cannot be changed by the user, absent complicated reprogramming of the devices, to present customized graphics in the device display.

In view of the limitations identified above, it can be appreciated that it would be desirable to have a system and method with which customized graphics can be displayed on an electrical device during various stages of device operation.

SUMMARY OF THE INVENTION

The present disclosure relates to a system and method for displaying graphics. In one arrangement, the method comprises the steps of receiving an identification of graphical data representing the graphic, and facilitating transmission of the graphical data representing the graphic to the electrical device such that the electrical device can display the graphic. In another arrangement, the method comprises the steps of receiving graphical data from a computing device, receiving an indication as to how the graphic is to be displayed, and displaying the graphic according to the received indication.

In one arrangement, the system comprises means for receiving an identification of graphical data representing the graphic, and means for facilitating transmission of the graphical data representing the graphic to the electrical device such that the electrical device can display the graphic. In another arrangement, the system comprises means for receiving graphical data from a computing device, means for receiving an indication as to how the graphic is to be displayed, and means for displaying the graphic according to the received indication.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

As noted above, disclosed is a system and method for displaying graphics. To facilitate description of the system and method, an example system will first be discussed with reference to the figures. Although this system is described in detail, it will be appreciated that this system is provided for purposes of illustration only and that various modifications are feasible without departing from the inventive concept. After the example system has been described, examples of operation of the system will be provided to explain the manners in which graphics display can be achieved.

Figure 1:
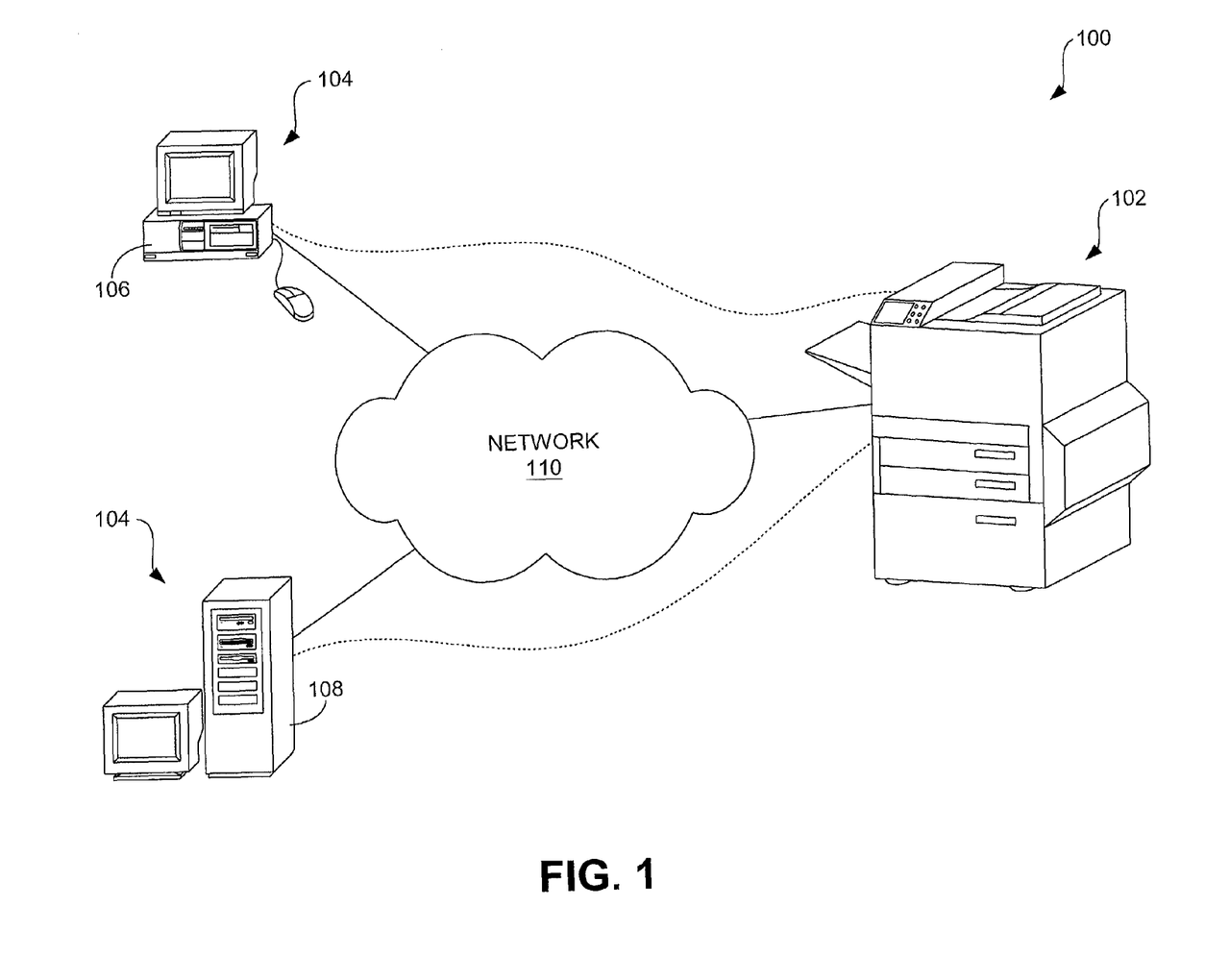
FIG. 1 is a schematic view of an example system.

Referring now in more detail to the drawings, in which like numerals indicate corresponding parts throughout the several views, FIG. 1 illustrates an example system 100. As indicated in this figure, the system 100 generally comprises an electrical device 102. As indicated in FIG. 1, this electrical device 102 can comprise, for example, a printer. Although shown and identified herein as a printer, it is to be understood that the electrical device 102 can comprise substantially any device that is configured to display graphics to a user. Accordingly, the electrical device 102 can, alternatively, comprise, by way of example, a photocopier, a facsimile machine, a multifunction peripheral (MFP), a network appliance, or any other such device.

In addition to the electrical device 102, the system 100 can include one or more computing devices 104. The computing devices 104 comprise any device that is capable of accessing and using the electrical device 102 and, more particularly, which is capable of communicating with the electrical device by transmitting data to and/or receiving data from the electrical device. By way of example, the computing devices 104 can comprise a personal computer (PC) 106 and a server 108. Although a PC 106 and a server 108 are identified in FIG. 1 and discussed herein, it will be appreciated that the computing devices 104 could, alternatively, comprise other types of computing devices including, for instance, notebook computers, personal digital assistants (PDAs), mobile telephones, etc.

As is further identified in FIG. 1, the electrical device 102 and the computing devices 104 can, optionally, be connected to a network 110 that typically comprises one or more sub-networks that are communicatively coupled to each other. By way of example, these networks can include one or more local area networks (LANs) and/or wide area networks (WANs). Indeed, in some embodiments, the network 110 may comprise a set of networks that forms part of the Internet. As is depicted in FIG. 1, one or more of the computing devices 104 can be directly connected to the electrical device 102. Such an arrangement is likely in a home environment in which the user does not have a home network or in an office environment where the electrical device 102 is used as a local "convenience" device. In such a scenario, communication can be facilitated with a direct electrical and/or optical connection or through wireless communication.

Figure 2:
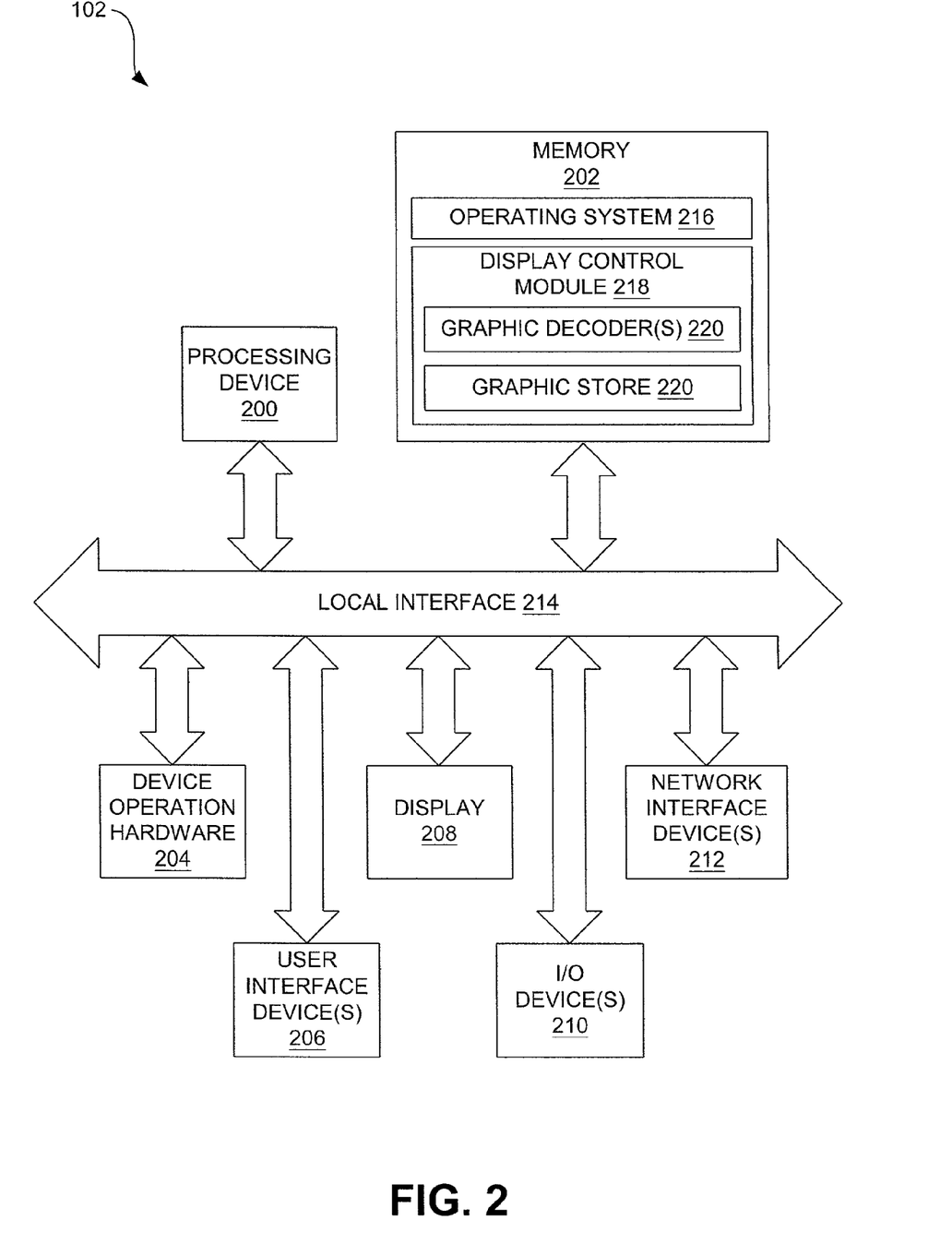
FIG. 2 is a schematic view of an electrical device shown in FIG. 1.

FIG. 2 is a schematic view illustrating an example architecture for the electrical device 102 shown in FIG. 1. As indicated in FIG. 2, the electrical device 102 can comprise a processing device 200, memory 202, device operation hardware 204, one or more user interface devices 206, a display 208, one or more input/output (I/O) devices 210, and one or more network interface devices 212. Each of these components is connected to a local interface 214 that, by way of example, comprises one or more internal buses. The processing device 200 is adapted to execute commands stored in memory 202 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the electrical device 102.

The device operation hardware 204 comprises the various components with which the core functionality of the electrical device 102 is facilitated. For example, where the electrical device 102 comprises a hard copy generation device such as a printer, the device operation hardware 204 can comprise a print engine that is capable of many different configurations. The one or more user interface devices 206, where provided, typically comprise interface tools with which the device settings can be changed and through which the user can directly communicate commands to the electrical device 102. By way of example, the user interface devices 206 comprise one or more function keys and/or buttons with which the operation of the electrical device 102 can be controlled.

The display 208 comprises a device with which graphics can be presented to the user. For instance, the display 208 can comprise a liquid crystal display (LCD) having a resolution of approximately 164 pixels by 64 pixels. Although a specific configuration of the display 208 has been provided, it will be appreciated that the display can take other forms. For example, the display 208 can, optionally, comprise a light emitting diode (LED) display, plasma screen, etc. Furthermore, it is to be appreciated that the display 208 can be touch-sensitive such that user commands and selections can be entered with the display. In such a scenario, the display 208 can be considered a user interface device.

With further reference to FIG. 2, the one or more I/O devices 210 are adapted to facilitate connection of the electrical device 102 to another device, such as a computing device 104, and may therefore include one or more serial, parallel, small computer system interface (SCSI), universal serial bus (USB), IEEE 1394 (e.g., Firewire™), and/or personal area network (PAN) components. The network interface devices 212, where provided, comprise the various components used to transmit and/or receive data over the network 110. By way of example, the network interface devices 212 include a device that can communicate both inputs and outputs, for instance, a modulator/demodulator (e.g., modem), wireless (e.g., radio frequency (RF)) transceiver, a telephonic interface, a bridge, a router, network card, etc.

The memory 202 includes various software (e.g., firmware) programs including an operating system 216 and a display control module 218. The operating system 216 contains the various commands used to control the general operation of the electrical device 102. The display control module 218 comprises the various software and/or firmware that controls the display of graphics in the display 208. The display control module 218 can, for instance, comprise one or more graphic (i.e., image) decoders 220 and a graphic store 220. The decoder or decoders 220 is/are configured to receive or retrieve graphical data and present the data to the user in the display 208. In some arrangements, these graphical data can be obtained from the graphic store 220. Operation of the display control module 218 is described in greater detail below in relation to FIG. 5. The graphic store 220 can exist in flash memory or some form of mass memory such as a hard disk or compact disk (CD).

Figure 3:
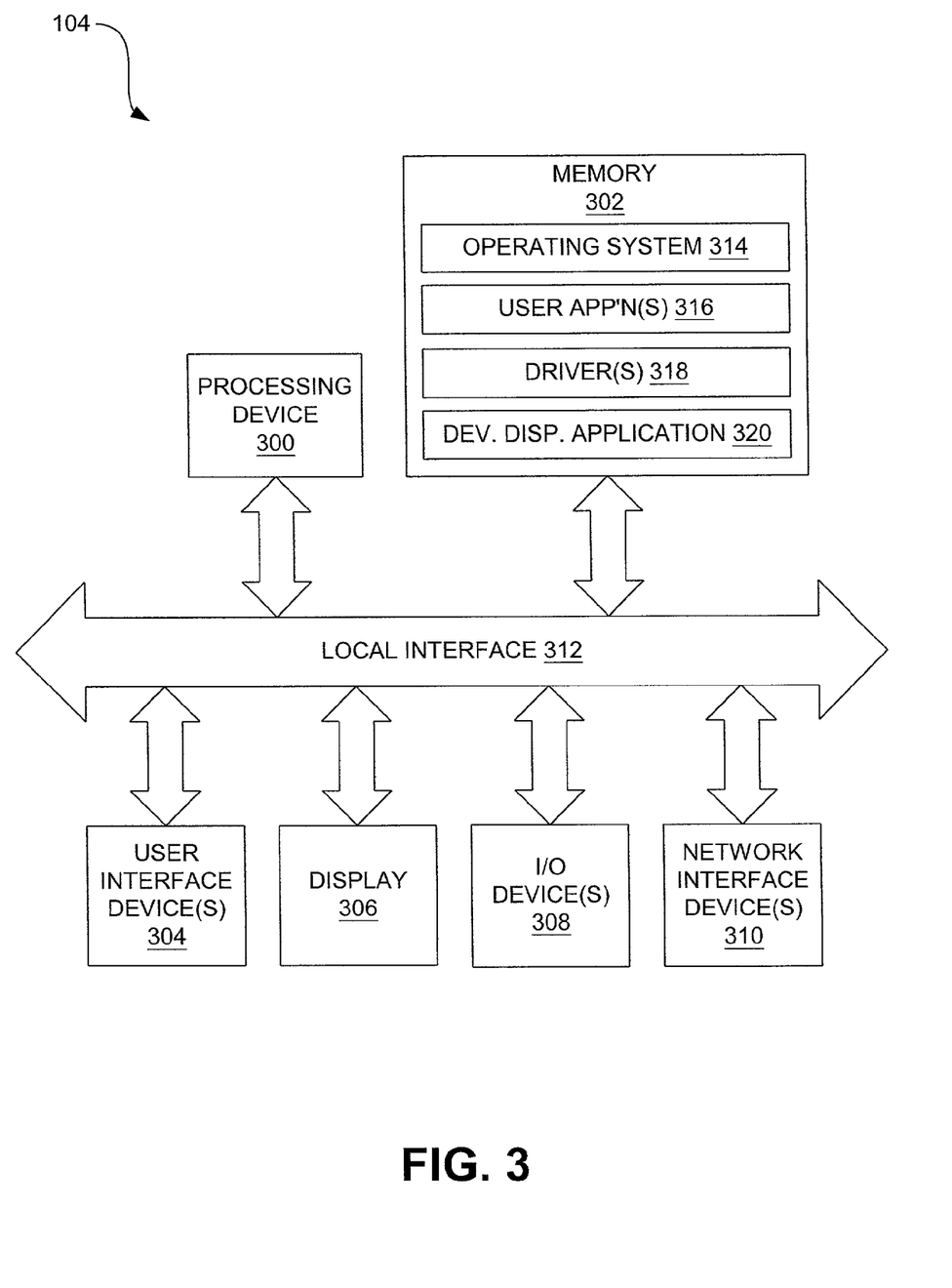
FIG. 3 is a schematic view of a computing device shown in FIG. 1.

FIG. 3 is a schematic view illustrating an example architecture for the computing devices 104 shown in FIG. 1. As indicated in FIG. 3, each computing device 104 can comprise a processing device 300, memory 302, one or more user interface devices 304, a display 306, one or more I/O devices 308, and one or more network interface devices 310, each of which is connected to a local interface 312. The processing device 300 can include any custom made or commercially available processor, a central processing unit (CPU) or an auxiliary processor among several processors associated with the computing device 104, a semiconductor based microprocessor (in the form of a microchip), or a macroprocessor. The memory 302 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 304 comprise those components with which the user can interact with the computing device 104. For example, where the computing device 104 comprises a PC, these components can comprise a keyboard and mouse. Where the computing device 104 comprises a handheld device (e.g., PDA, mobile telephone), these components can comprise function keys or buttons, a touch-sensitive screen, etc. The display 306 can comprise a computer monitor or plasma screen for a PC or an LCD for a handheld device. The one or more I/O devices 308 and the one or more network interface devices 310 operate and can have similar configuration to the like-named components described above with relation to FIG. 2.

The memory 302 normally comprises an operating system 314, one or more user applications 316, one or more drivers 318, and a device display application 320. The operating system 314 controls the execution of other software and provides scheduling, input-output control, file and data management, memory management, and communication control and related services. The user applications 316 comprise applications that execute on the computing device 104 and provide and/or identify data to be printed. By way of example, the user applications 316 can comprise applications which output document data such as a word processing application, image manager, etc.

The one or more drivers 318 can comprise software and/or firmware that is used to translate data received, output, or identified by the user applications 316 into a format (e.g., language) which is suitable for the electrical device 102. Although shown as being provided in the memory 302 of the computing device 104, persons having ordinary skill in the art will recognize that the one or more drivers 318 can be located on another device such as the electrical device 102, if desired. As is discussed in greater detail below with respect to FIG. 4, the device display application 320 comprises software and/or firmware that can be used to control which graphics are displayed in the display 208 of the electrical device 102. By way of example, the device display application 320 can comprise an application that is stored on the computing device 104 along with a driver adapted for a particular electrical device. In another example, the display application 320 can comprise a pre-existing application, e.g., graphics application, that is stored on the computing device 104. In any case, the display application 320 can include a user interface (e.g., graphical user interface (GUI)) with which the user can select or identify graphical data to be transmitted to and/or displayed by the electrical device 102.

Various software and/or firmware programs have been described herein. It is to be understood that these programs can be stored on any computer-readable medium for use by or in connection with any computer-related system or method. In the context of this document, a computer readable medium is an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, operation of the system will now be discussed. In the discussion that follows, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Generally speaking, operation of the system involves displaying desired graphics in the display 208 of the electrical device 102. This display can be facilitated in various different ways. In one scenario, graphical data can be transmitted along with a job sent to the electrical device 102, for instance in a header of the job, for display by the electrical device. In another scenario, graphical data stored on the electrical device 102 can be used to present one or more graphics to the user depending upon the operational state of the device. In a further scenario, the graphical data can be sent to the electrical device 102 along with a job and the data stored by the electrical device for future display to the user for particular operational states or for all states generally. In any case, the display control module 218 is utilized to decode the graphical data and deliver it for display in the display 208.

Figure 4:
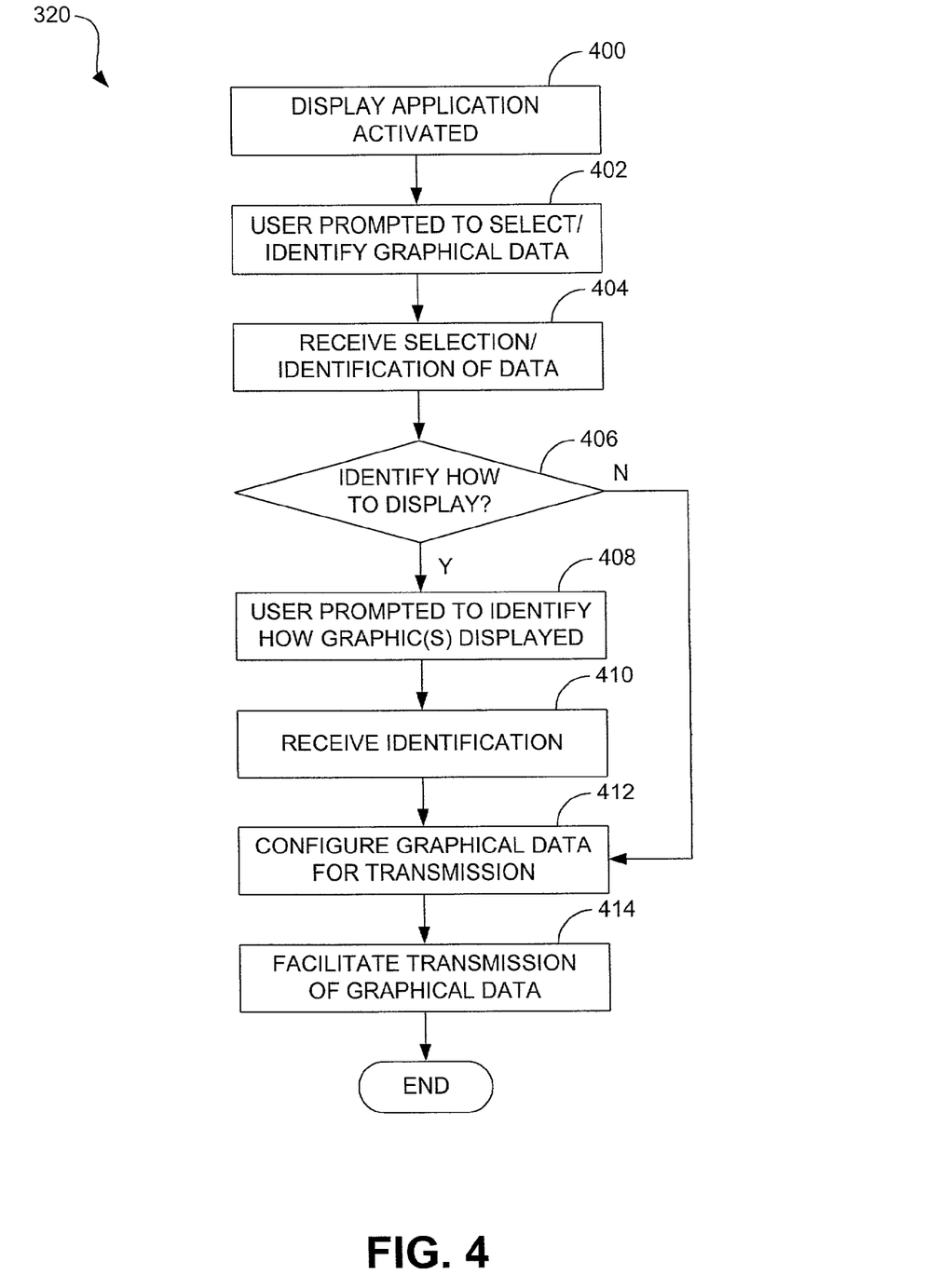
FIG. 4 is a flow diagram that illustrates the operation of a display application of the computing device shown in FIG. 3.

With reference to FIG. 4, illustrated is an example of facilitating display of one or more graphics through transmission of graphical data from a computing device 104. More particularly, shown is a manner of facilitating of display of one or more graphics with the device display application 320. Beginning with block 400 of this figure, the display application 320 is first activated. This activation can occur in various different ways. Normally, however, activation comprises receipt of an execution command that is registered by "double-clicking" an icon on the user desktop or otherwise selecting an execution link provided to the user (e.g., in a start-up menu).

Irrespective of the manner in which the activation occurs, the user is prompted to select or identify graphical data to be displayed by the electrical device 102, as indicated in block 402. The graphical data can be in any format the electrical device 102 is configured to use. For example, the data can comprise JPEG, BMP, TIFF, GIF, GIF89a, or other formatted data. The graphical data can represent default graphics provided by the device display application 320 or graphics that are stored outside of the display application, for instance in an appropriate graphic store of the device memory 302 or in a separate computing device. In the latter scenario, the user may identify the location of the graphical data with, for instance, a network address (e.g., universal resource locator (URL)) with which the graphical data can be retrieved by the device display application 320 or by the electrical device 102.

Once the graphic(s) have been selected or identified, the selection/identification can be received by the device display application 320, as indicated in block 404. At this point, the user can identify how the graphics are to be displayed by the electrical device 102. For example, the user can specify whether the graphics are to be displayed only for the particular job that is being transmitted to the electrical device 102, displayed generally by the electrical device (e.g., for all jobs sent to the device), or displayed by the device for particular stages of electrical device operation. With reference to decision element 406, if the user does not wish to designate how the graphical information is to be displayed, flow continues down to block 408 described below. In this scenario, the electrical device 102 can be configured for a default display operation in which the graphic(s) will be displayed according to a predetermined mode (e.g., only for the particular job). If, on the other hand, the user would like to designate how the graphics are to be displayed, flow continues on to block 410 at which the identification is received. Notably, receipt of this information can be facilitated with a menu interface which identifies various display scenarios to the user.

Once the identification has been made, the graphical data can be configured for transmission to the electrical device 102, as indicated in block 412. Where the graphical data is to be sent to the electrical device 102 as part of a job, the data can be configured for transmission to the electrical device in the job header. In such a situation, the graphical data can be identified to the imaging device 102 with one or more commands. The command can, for instance, be in the form of a variable written in an electrical device language. If the electrical device 102 is a hard copy generation device, such as a printer, the language may be a printer job language (PJL). If this is the case, the variable can comprise, for instance, "PJL DEFAULTGRAPHIC",or appropriate equivalent, which identifies data as graphical data.

Where the graphical data is independent of a job, e.g. where the device display application 320 is being used to configure the display options of the electrical device 102, generally or for specific modes of operation, the graphical data can be transmitted as a package to the electrical device. In this case, the command also identifies when the graphics are to be displayed. For example, where the data is to be displayed during device initialization (i.e., booting), the command identify the graphical data can comprise the variables "PJL IINITGRAPHICS". Similarly, where the data is to be displayed during a ready state, operating state, or power-save state, the commands can, for instance, comprise the variables "PJL RDYGRAPHICS", "PJL OPGRAPHJCS", and "PJL PWR SAVEGRAPHICS", respectively. Although specific commands have been provided herein for purposes of example, persons having skill in the art will appreciate that alternative commands could be used depending upon the configuration of the electrical device 102 and/or the language it speaks.

At this point, the device display control 320 can be used to facilitate transmission of the graphical data, including any display commands used to indicate the manner in which graphics are to be displayed, as indicated in block 414. Where the graphical data resides on the computing device 104, this facilitation comprises actually transmitting the graphical data. Where, on the other hand, the graphical data is stored remotely, facilitation can comprise transmitting an appropriate network address (e.g., URL) to the electrical device 102 so that it can retrieve the graphical data itself. In any case, flow for the operation of the device display application 320 is then be terminated in an appropriate manner.

Figure 5:
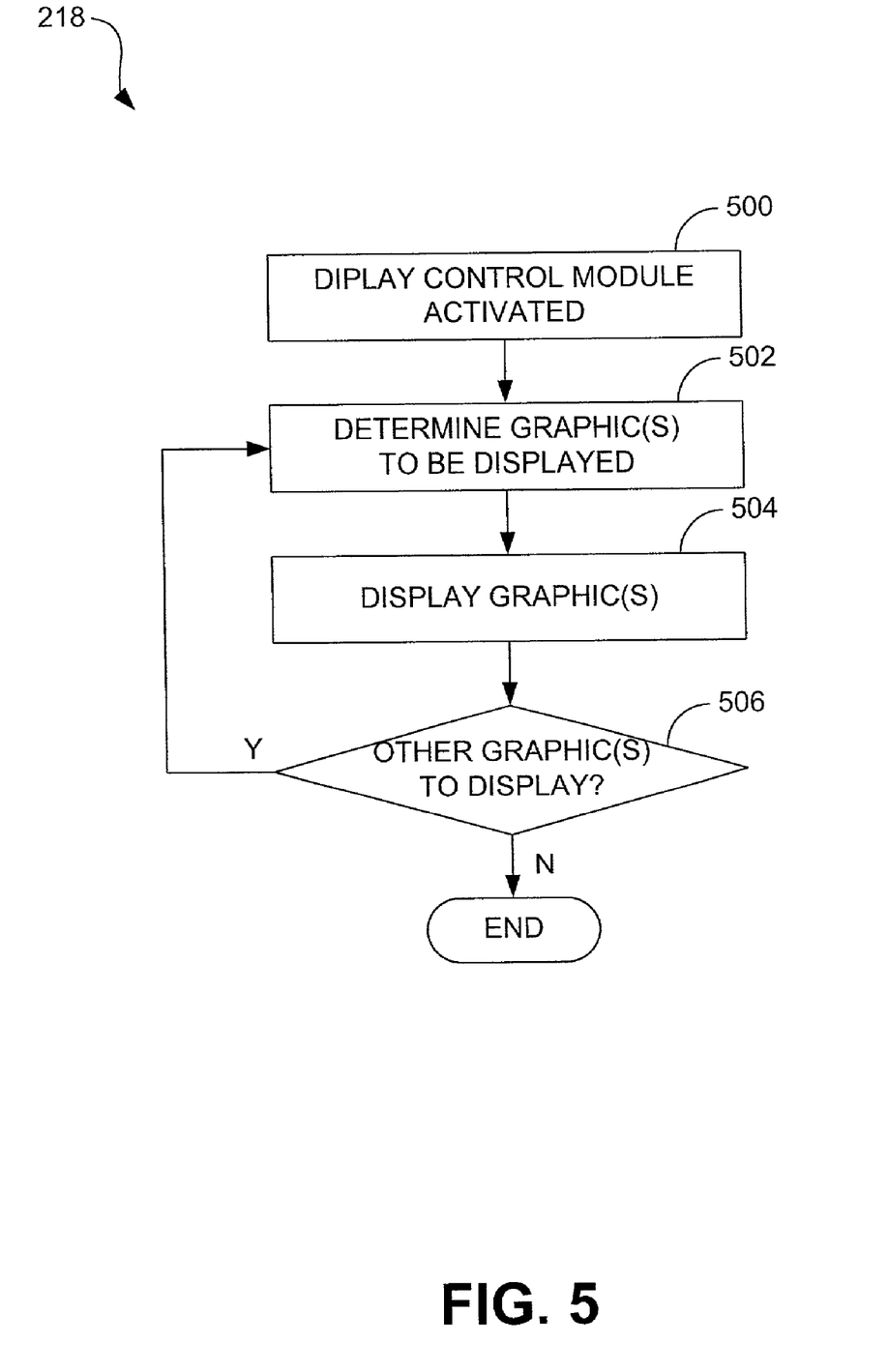
FIG. 5 is a flow diagram that illustrates operation of a display control module of the electrical device shown in FIG. 2.

Referring now to FIG. 5, illustrated is an example of facilitating display of one or more graphics with the electrical device 102. More particularly, shown is an example of operation of the display control module 218. Beginning with block 500, the display control module 218 is activated. As with activation of the display application 320 of the computing device 104, this activation can occur in various different ways. Typically, however, this activation occurs in response to a graphic display stimulus received by the display control module 218. This stimulus can comprise receipt of a display command that is received from the computing device 104, for instance where a particular graphic is to be displayed for the duration of performance of a particular job received from the computing device. In another example, the stimulus can comprise detection of a particular electrical device state where the display control module 218 is configured to display particular graphics for particular device states (e.g. initiation, ready, operating, and power save states).

Regardless of the manner in which the display control module 218 is activated, once activated the module can determine which graphic or graphics is/are to be displayed in the display 208. How this determination is made also typically depends upon the activation stimulus. For example, where a display command is received along with a job sent from the computing device 104, the display control module 218 may read the command from the job header. Examples of such commands have been provided above. Where the stimulus is detection of a particular electrical device state in which a particular graphic is to be displayed, determination can comprise consulting an appropriate look-up table that identifies which graphic or graphics stored in the graphic store 220 is/are to be displayed for that state.

Once it has been determined which graphic or graphics is/are to be displayed, the display control module 218 can display the graphic(s), as indicated in block 504. This displaying normally comprises decoding the graphical data for the graphic(s) and delivering the decoded data to the display 308. Where the graphical data was received from the computing device, these data are decoded. Where the data is stored in the graphic store 220, those data are decoded. Where, on the other hand, a network address (e.g., URL) was received in lieu of graphical data, flow includes that additional step of first retrieving the data.

The electrical device 102 can display a single graphic, two or more graphics simultaneously or sequentially, or a series of graphics (i.e., frames) that are displayed in a particular sequence to provide an animation. In the latter case, a format such as GIF89a by Compuserve™ is particularly suitable for the graphical data in that, as is known in the art, the GIF89a format allows multiple frames to be encoded in a single compressed file that can easily be transmitted from the computing device 104 to the electrical device 102.

At this point, it can be determined whether another graphic is to be displayed, as indicated in decision element 506. If not, flow for the display session is terminated. If, however, one or more further graphics are to be displayed, flow returns to block 502 at which it is determined which graphic(s) to display.

FIGS. 6A-6D provide example graphics that can be displayed by the display control module 218. Specifically, example graphics for initiation, ready, operation, and power save states are illustrated in FIGS. 6A-6D, respectively. Although particular examples are shown, it will be understood that they are provided for purposes of illustration only and are not intended to limit the scope of the present disclosure.

Figure 6A:
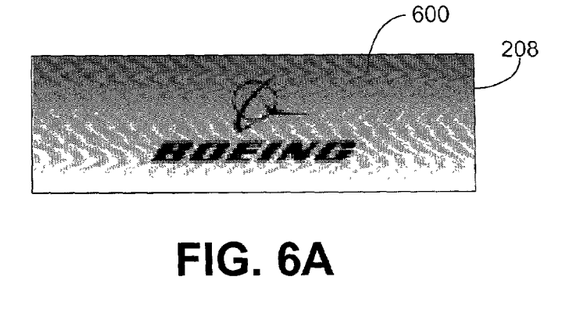
FIGS. 6A-6D are views of various example graphics that can be displayed with the electrical device of FIG. 2 in various stages of operation of the device.
Figure 6B:
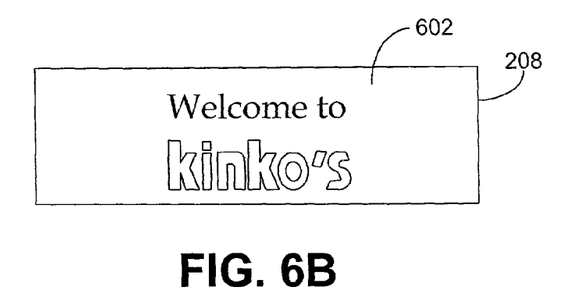
Figure 6C:
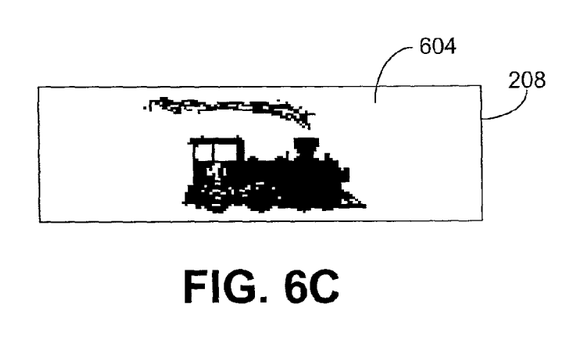
Figure 6D:
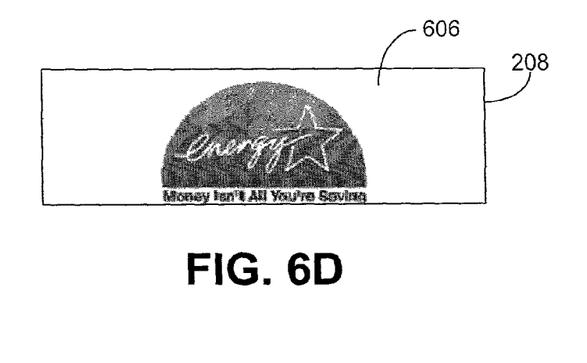

With reference to FIG. 6A, if the electrical device 102 is used by the Boeing Company, a Boeing logo 600 can be displayed in the display 208 during booting of the device. With regard to FIG. 6B, if the electrical device 102 is owned by Kinkos, Inc., a "Welcome to Kinkos" message 602 can be displayed to the user during the ready state of the electrical device 102. Turning to FIG. 6C, operation of the electrical device 102 can cause a train animation 604 to be displayed. In such a scenario, the train could move from left to right across the display 208 to imply that work is being done by the device 102. As noted above, the animation can be a GIF89a animation. Finally, with regard to FIG. 6D, an Energy Star symbol can be shown during a power save state of the electrical device 102 to identify that the device is compliant with the Energy Star Program of the U.S. Environmental Protection Agency (EPA). Persons having ordinary skill in the art will appreciate that many variations on the above-described graphics are possible.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for facilitating display of a graphic on an electrical device, comprising:

receiving with an electrical device that is one of a printer, photocopier, a facsimile machine, a multifunction peripheral, and a network appliance graphical data sent to the electrical device from a host computer, the graphical data representing a graphic having been selected by a user with the host computer only for the purpose of repeated display during a given state of the electrical device;

receiving with the electrical device an indication from the host computer as to what electrical device state the selected graphic is to be displayed in a control panel display of the electrical device; and displaying the selected graphic in the electrical device control panel display each time the electrical device state occurs.

2. The method of claim 1, wherein receiving graphical data comprises receiving the graphical data along with a print job comprising separate data to be printed by the electrical device, such that data only to be displayed and data only to be printed are transmitted together to the electrical device.

3. The method of claim 1, wherein the electrical device state comprises at least one of an initiation state, a ready state, an operating state, and a power save state.

4. The method of claim 1, wherein the graphical data comprises two or more frames that can be displayed in sequence to provide an animation.

5. A device display application that executes on an electrical device for facilitating display of a graphic on the electrical device, the application comprising:

means provided on the electrical device that is one of a printer, a photocopier, a facsimile machine, a multi-function peripheral, and a network appliance for receiving graphical data that has been selected by the user from a computing device the graphical data representing a selected graphic whose purpose is for repeated display during a given state of the electrical device;

means provided on the electrical device for receiving an indication as to what electrical device state the selected graphic is to be displayed; and means provided on the electrical device for displaying the selected graphic in a control panel display of the electrical device each time the electrical device state occurs.

6. The application of claim 5, wherein the means for receiving graphical data comprises means for receiving the graphical data along with a print job comprising separate data to be printed by the electrical device, such that data only to be displayed and data only to be printed are transmitted together to the electrical device.

7. The method of claim 1, wherein displaying the graphic in a device control panel comprises displaying the graphic in a printing device control panel.

8. The method of claim 7, wherein displaying the graphic in a printing device control panel comprises displaying the graphic in a printer control panel.

9. The method of claim 1, wherein the graphic is displayed on the electrical device as part of a graphical user interface of the device instead of as a preview of what is to be printed.

* * * * *

UNITED STATES PATENT AND TRADEMARK OFFICE
CERTIFICATE OF CORRECTION

PATENT NO. : 7,385,610 B2  Page 1 of 1
APPLICATION NO. : 09/982906
DATED : June 10, 2008
INVENTOR(S) : Kevin Owen It is certified that error appears in the above-identified patent and that said Letters Patent is hereby corrected as shown below:

In column 7, line 25, delete "IINITGRAPHICS" and insert -- INITGRAPHICS --, therefor.

In column 7, line 29, delete "OPGRAPHJCS" and insert -- OPGRAPHICS --, therefor.

Signed and Sealed this

Eleventh Day of November, 2008

JON W. DUDAS
*Director of the United States Patent and Trademark Office*